July 24, 1962 G. V. YOUNG 3,046,469
TRANSISTOR REGULATED POWER SUPPLY
Filed Jan. 7, 1958
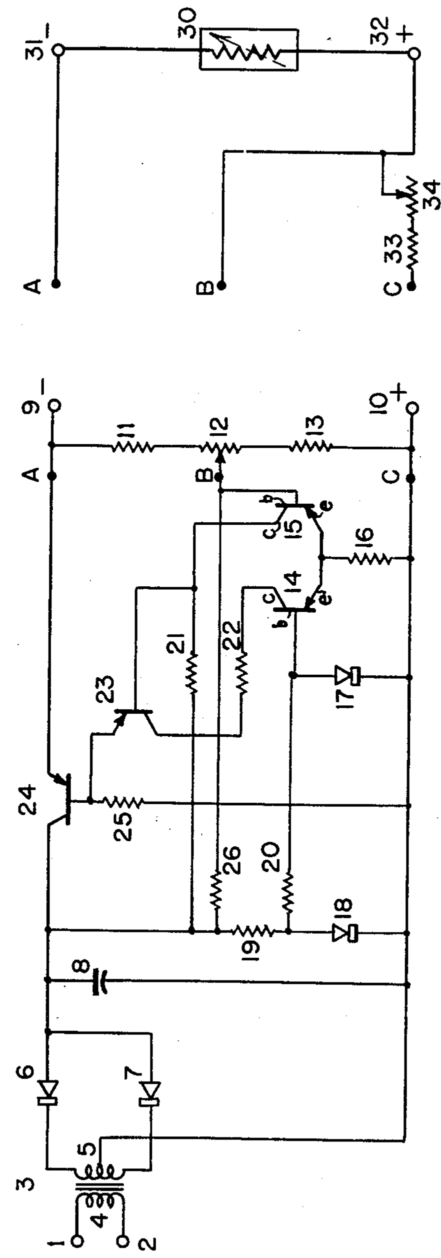
INVENTOR.
GEORGE V. YOUNG
BY Harry R. Lubcke
AGENT United States Patent Office 3,046,469

Patented July 24, 1962

3,046,469

TRANSISTOR REGULATED POWER SUPPLY

George V. Young, Los Angeles, Calif., assignor, by mesne assignments, to Endevco Corporation, Pasadena, Calif., a corporation of California Filed Jan. 7, 1958, Ser. No. 707,607
4 Claims. (Cl. 323—22)

My invention relates to regulated electrical power supplies and particularly to such a supply employing solid state elements in which the regulation is insensitive to temperature as well as to ambient electrical conditions.

The regulated power supply has become an important device in the field of electronics because of the stability of electrical output it affords in spite of variable ambient electrical conditions. While the use of solid state two and three electrode devices in such a power supply is attractive from the standpoints of reduced size, reduced power consumption, capability of operation at low voltages and high currents, adaptability to hermetic sealing and others, the art has been blocked from effective use of solid state devices because of the serious alteration of the operating characteristics thereof with temperature. Where considerable variation of temperature occurs the variation of solid state characteristics has been so great as to largely nullify the regulation sought.

It is evident that the best suited device for counteracting the effect of temperature upon a solid state device is another solid state device having the same characteristics and similarly operated in which the effect of temperature of the one is cancelled by the other. I accomplish this by forming the two devices in a differential amplifier stage. The temperature changes mentioned affect the amplifier in the common mode, to which a differential amplifier has small response. I impress any variation of the electrical output sought to be regulated as a differential voltage in opposition to the voltage of a constant voltage source. By forming this differential voltage of unregulated as well as regulated components from different portions of the power supply I am able to attain exactly zero variation of voltage (or current) output in spite of changes in the input power supply voltage.

The output of the differential amplifier is applied serially through two emitter follower connected transistors, the latter of which acts as a series current regulator in the circuit which includes the load. I arrange the input to the differential amplifier to control the voltage at the output terminals of the power supply to constancy regardless of the current drawn, or such as to keep the current through the load circuit constant regardless of changes in impedance of the load circuit in an alternate embodiment.

An object of my invention is to provide a solid state power supply having operating characteristics insensitive to temperature.

Another object is to provide a power supply having zero variation of either the voltage across or the current through the load in spite of changes in the supply voltage.

Another object is to provide a regulated power supply which may be arranged to give constant voltage or constant current output regardless of changes in the electrical characteristics of the load.

Another object is to provide a regulated power supply of relatively few parts of small size, light weight, rugged nature, capability of regulating low voltages and suited for encapsulation.

Other objects of my invention will become apparent upon reading the following detailed specification and upon examining the accompanying drawings, in which:

FIG. 1 shows the schematic diagram of a constant output voltage regulated power supply, and FIG. 2 shows the schematic diagram of a constant current modification.

In FIG. 1 numerals 1 and 2 indicate the alternating current power input terminals. Such power is normally of the order of 115 volts and from 60 to 400 cycles per second in frequency. Transformer 3 provides isolation between the prime power source and the output terminals of the power supply, and may be a step down transformer with primary 4 and center-tapped secondary 5 of fewer total turns than the primary. The R.M.S. voltage across the entire secondary winding is desirably 30 volts higher than the maximum to be supplied at the output terminals. Rectifier diodes 6 and 7 are of a type suitable to carry the current required at the operating voltage and may be of the diffused junction rectifier type.

Capacitor 8 comprises the filter portion of the power supply and normally has a capacitance of a few hundreds of microfarads at the required voltage rating.

The remaining part of FIG. 1 is concerned with the regulatory portion of the power supply and is best described by beginning with the input to the control portion. This starts with output terminals 9 and 10. The polarity of the direct voltage at these terminals is negative at the former and positive at the latter. The embodiment of FIG. 1 maintains constant voltage at these output terminals. A potentiometer is accordingly formed thereacross, consisting of resistors 11, 12 and 13, and having a resistance of the order of 200 ohms per volt. For a two to one range of output voltage adjustment by altering the position of the variable arm the resistance of potentiometer resistor 12 should be about 40% of the total resistance between the output terminals.

Transistors 14 and 15 are connected as a one stage direct coupled differential amplifier. The emitters *e* thereof are connected together and to a common emitter resistor 16 having a resistance of the order of one thousand ohms. The base electrode *b* of transistor 15 is connected to the variable contact of potentiometer 12, the base to emitter potential of that transistor thus being altered by any change of voltage between the variable potentiometer contact and output terminal 10. For any adjustment of the variable contact this is a fixed fraction of the total voltage across the output terminals.

By contrast, the base electrode *b* of transistor 14 is connected to constant voltage source Zener diode 17. This is the second in a two stage constant voltage source which also includes similar Zener diode 18. The latter connects to the filter portion of the power supply through resistor 19, which has a resistance of a few thousand ohms. This allows the junction point between diode 18 and resistor 19 to be maintained at a relatively constant voltage of, say, eight volts. A current of the order of ten milliamperes flows through this resistor-diode combination. This voltage is maintained constant to with about 1% regardless of residual ripple, variations in the source voltage, and the finite internal impedance of the transformer and diodes with changing current.

The relatively stable voltage across Zener diode 18 is impressed across similar diode 17 through resistor 20, which has a resistance value approximately half that of resistor 19. Zener diode 17 is preferably selected to operate at a constant voltage of five volts at a current of five milliamperes, which diode is capable of manufacture with a zero temperature coefficient of voltage. I determined experimentally that nearly all Zener diodes have a zero temperature coefficient for voltage drop at a particular current. This was determined by successively lowering and raising the temperature of the particular Zener diode for a given current and then altering this current and repeating until the voltage drop was insensitive to temperature changes. I prefer those Zener diodes having temperature insensitivity at the five volt-five milliampere operating point. This behavior has also been reported by George Porter in the paper, "The Zero Temperature Coefficient Zener Diode," appearing in "Rectifier News," a publication of International Rectifier Corp., El Segundo, California; Dec.-Jan. 1958-1959 issue, page 2.

Resistor 20 accommodates the two different voltage drops across the two different diodes. Both diodes maintain voltage drops within 1%, thus the regulation of the pair is the product of 1% by 1% or 0.01%. This constitutes an excellent voltage reference.

Returning now to the differential amplifier, it will be realized that an ambient change in the electrical characteristics of transistors 14 and 15 will be the same in both. In a differential amplifier, any variation which affects both sides of the amplifier equally is amplified only in the common mode. This amplification is low, only a few times in a representative embodiment. Such common variations as those due to temperature may be made as near equal as desired by suitably selecting the transistors employed in matched pairs.

On the other hand, a variation of voltage at the output terminals of the power supply is impressed upon the base electrode *b* of transistor 15 while the base electrode *b* of transistor 14 is maintained at an accurately fixed voltage as has been explained by connection of the latter base to diode 17. The voltage to be regulated is thus impressed upon the differential amplifier as a differential input, for which the amplification is of the order of two hundred. The effect of temperature is thus seen to be a very small quantity in comparison to the desired degree of regulation.

The structure of the differential amplifier is completed by equal or approximately equal resistors 21, 22, having a resistance of the order of twenty thousand ohms each. One of these is connected to one collector *c* of each of transistors 14 and 15, with the opposite end of each resistor connected to the filter portion of the power supply for energizing the differential amplifier. In the embodiment shown all the transistors are of the PNP type. The upper filter portion is at negative potential for proper energization of the transistors.

Transistor 23 is connected as an emitter follower. It is employed for the purpose of reducing impedance in the control chain between the previously described differential amplifier and power transistor 24, which latter acts as a series regulator in the power supply.

The base electrode of transistor 23 is connected to the collector of transistor 15, through which connection the output of the differential amplifier is impressed upon it. The emitter of transistor 23 is connected through resistor 25, having a resistance of the order of ten thousand ohms, to the positive voltage terminal of the power supply. The collector of this transistor is connected to the negative terminal of the unregulated power supply at the filter portion. Transistor 23 acts as an impedance-reducer of unity gain in approximately the same way as the cathode follower vacuum tube operates in the known prior art. The equivalent internal impedance of the output circuit of transistor 23 may thus be less than two hundred ohms.

The control signal at this impedance is direct coupled to the base of transistor 24 by virtue of resistor 25 being in a common circuit with the emitter of transistor 23. The emitter ciruuit of power transistor 24 is completed to the positive terminal of the power supply through the output voltage divider composed of resistors 11, 12 and 13, and when normal operating currents are drawn through the load connected to terminals 9 and 10 also. The collector of transistor 24 is connected to the negative filter portion of the power supply. The effective internal impedance of this power transistor is less than two ohms.

A change of power supply output voltage due to a change in alternating current supply voltage is reduced to zero by the functioning of resistor 26, which is connected between the filter portion and the adjustable tap on potentiometer 12. Resistor 26 may normally be fixed and has a value of a few hundred thousand ohms, the exact value depending upon the particular embodiment. It is seen that a portion of the voltage change occurring from any electrical variation of the input to the power supply is impressed upon the base electrode of transistor 15. This portion is as the relation between the resistance value of resistor 26 and the base input impedance of transistor 15. Since the latter is small in relation to the resistance value of resistor 26 the voltage increment added at the base of transistor 15 is also small.

The functioning of the differential amplifier and the emitter follower stages counteracts changes in output voltage by a suitable phase reversal. Since no correction system can correct completely a small residual change in output voltage remains. For an example, assume that the unregulated voltage increased. The regulatory functioning described decreases an otherwise increase in the output voltage to the prior value, nearly. An additional corrective increment from resistor 26 to the correction system adds just enough more to cause the regulatory functioning to be complete. The basic increment reduces the internal impedance of the power supply from the two ohms previously mentioned for the power transistor impedance-transforming stage to about one-tenth ohm.

The regulatory portion of my power supply in adaptable for constant current rather than constant voltage regulation as previously described. Constant current regulation is desirable when a strain gage, for example, is operated over long copper wires at a considerable distance from the control station housing the power supply and the copper wires are subject to considerable ambient temperature change, as from sunshine to cold night. The response of the transducer is directly proportional to the current through it, thus a high degree of constancy of this current is desirable.

This alternate mode of regulation is of another component of the electrical power flowing at the output terminals; i.e., current rather than voltage.

The modification is shown in FIG. 2. The connection points A, B and C in FIG. 2 correspond to those in FIG. 1. When the modification is made the output potentiometer 11, 12, 13 of FIG. 1 is accordingly omitted.

In FIG. 2 the useful load is represented as impedance 30, indicated as variable by a dotted arrow to correspond to the above example, or to any other in which the impedance of the load itself varies. The load current flows from point A to new output terminal 31, through load 30, the other new output terminal 32 and to point C through new auxiliary resistors 33 and 34, the latter being variable. In practice, the variable resistor 34 may be a number of hundreds of ohms and the fixed resistor 33 less than a hundred ohms. The latter prevents the total resistance decreasing to zero and so the control action being lost.

A connection is taken from the load side of resistors 33, 34 to point B, which latter connects to the base electrode of transistor 15 in FIG. 1, the start of the control circuit previously described. Because resistors 33, 34 intervene between the base and the emitter of transistor 15 the voltage drop of the current supplied by the power supply is applied to that transistor for differential amplification by the differential amplifier. Accordingly, the control circuit of FIG. 1 then controls to keep this voltage constant, thus the load current constant. The value of this current may be adjusted by variable resistor 34.

Certain modifications of my invention are possible. Resistance 26 may be omitted and a small positive response to supply voltage change obtained as the characteristic for the regulated power supply. Resistance 26 may be made smaller than the value for zero change and a negative response characteristic to supply voltage variations obtained.

A half wave rectifying action for that portion of the power supply may be obtained by omitting either rectifier 6 or rectifier 7. The half of transformer secondary 5 associated with the rectifier removed may also be eliminated.

A filter portion of the power supply consisting of more than the one capacitor 8 and including resistors or inductors in series therewith may be employed.

NPN transistors may be employed instead of the PNP types illustrated by reversing the polarity of voltages supplied thereto. This may be accomplished by reversing the polarity of rectifier diodes 6 and 7 from that shown, or by inverting the whole control circuit with respect to the output terminal polarities shown.

Transistors 14, 15 and 23 are of the usual low power type. Power transistor 24 and diodes 6 and 7 must have sufficient power capacity to handle the power output desired, as must also transformer 3.

Various other modifications in the characteristics of the circuit elements, details of circuit connections and alteration of the coactive relation between the elements may be taken without departing from the scope of my invention.

Having thus fully described my invention and the manner in which it is to be practiced, I claim:

1. A regulator for a direct current electric power source having output terminals comprising a single cascade-connected two-Zener-diode constant-voltage circuit having a first resistor connected to said direct current source and a second resistor connected between said Zener diodes to render the voltage of said constant-voltage circuit insensitive to temperature changes, a third resistor connected to at least one of said output terminals to provide a voltage proportional to one component of electric power supplied at said output terminals, a single stage transistor differential amplifier having symmetrical electrical characteristics, said differential amplifier differentially connected directly to a Zener diode of said constant-voltage circuit and to said third resistor, a first emitter-follower transistor connected to the output of said differential amplifier, a second emitter-follower transistor, one electrode of said second emitter-follower transistor connected to the output of said first emitter-follower transistor and to a fourth resistor, two other electrodes of said second emitter-follower transistor connected between one of said output terminals and said direct current source, and a passive resistive impedance connected between said direct current source and said third resistor; said differential amplifier and said emitter-follower transistors phased to stabilize said one component of electric power supplied at said output terminals and said resistive impedance coactive through said differential amplifier to similarly stabilize said one component of electric power regardless of voltage variation of the electric power supplied from said direct current source.

2. A regulator for a direct current power source having two output terminals connected to a load comprising a compound temperature-insensitive voltage circuit having only two Zener diodes and only two resistors serially-connected and connected to said direct current power source proportioned to allow a selected value of current to flow from said direct current power source through the second of said Zener diodes, a third resistor connected to at least one of said output terminals to provide a voltage proportional to one component of electric power supplied to said load, a pair of substantially identical transistors connected to form a differential amplifier having symmetrical electrical characteristics, said differential amplifier differentially connected directly to said second Zener diode and to said third resistor, a first emitter-follower-connected transistor connected to the output of said differential amplifier, a second emitter-follower transistor having a resistor connected between the base thereof and one said output terminal, said second emitter-follower transistor connected also to the output of said first-emitter-follower-connected transistor and to the other said output terminal serially with respect to said direct current power source, and a fourth resistor connected between said direct current power source and said third resistor; said differential amplifier and said emitter-follower transistors phased to maintain constant one component of electric power supplied to said load, and said fourth resistor coactive through said differential amplifier and said emitter-follower transistors to similarly maintain said one component constant regardless of voltage variation of the electric power supplied from said direct current power source.

3. A direct current regulator having two input and two output terminals comprising an adjustable potentiometer connected across said output terminals, only two transistors of essentially identical electrical characteristics having emitter, base and collector electrodes, the two emitters connected together and to one said output terminal through a resistor, one base connected to the adjustable tap of said adjustable potentiometer, one low constant-voltage-drop temperature-insensitive Zener diode, the other base connected to said one output terminal directly through said Zener diode, both the collectors connected through individual resistors of substantially equal resistance to one of said input terminals; a third transistor for impedance reduction having emitter, base and collector electrodes, the base of said third transistor connected to the collector of said essentially identical transistor the base of which connects to said adjustable tap, the collector of said third transistor connected to the collector of the other said essentially identical transistor through one of said resistors of substantially equal resistance, a power transistor having emitter, base and collector electrodes, the base of said power transistor connected to the emitter of said third transistor and also to said one output terminal through a resistor; one second and higher constant-voltage-drop Zener diode connected to said one output terminal and also to said one direct current terminal through a resistor, said Zener diodes connected together through a resistor, said adjustable tap also connected to said one input terminal through a further resistor; said two essentially identical transistors composing an electrically balanced differential amplifier electrically constituted to produce a small output due to common mode changes in temperature of said essentially identical transistors and to produce a large output due to the differential mode of the output terminal voltage changes, said large output phased to alter the operating point of said power transistor through said third transistor to maintain a constant voltage across said output terminals; the connection through said further resistor acting to alter the voltage on said one collector of said two essentially identical transistors a small amount to prevent a change in voltage at said input terminals from altering the voltage at said output terminals.

4. Means to electrically regulate a power supply having a source of direct current electrical energy comprising output terminals, a first resistor connected between said source of energy and one of said output terminals, a first Zener diode connected across said source through a second resistor, a second Zener diode connected to said first Zener diode through a third resistor, the resistance of said third resistor selected to pass a current such that the voltage drop of said second Zener diode is independent of temperature, a two-transistor differential amplifier having balanced electrical characteristics connected differentially between said output terminals and said second Zener diode, said differential amplifier being connected directly to said second Zener diode, a first emitter-follower impedance-reducing transistor amplifier stage connected to the output of said differential amplifier, a second emitter-follower power transistor amplifier stage connected to the output of said first emitter-follower stage, to one said output terminal through a fourth resistor and in series between said source of energy and said other output terminal as a series current regulator, a bridging resistor connected between said source of energy and said differential amplifier; said differential amplifier formed to be electrically insensitive to ambient temperature conditions effective thereon in the common mode and sensitive to voltage change across said first resistor in the differential mode with respect to the voltage across said second Zener diode to control the current flowing between said output terminals; said bridging resistor coactive with said differential amplifier to introduce a differential voltage at the input of said differential amplifier to control said current flowing between said output terminals independent of voltage variation of said source of energy.

References Cited in the file of this patent

UNITED STATES PATENTS

| | | |
|---|---|---|
| 2,693,568 | Chase | Nov. 2, 1954 |
| 2,751,549 | Chase | June 19, 1956 |
| 2,776,382 | Jensen | Jan. 1, 1957 |
| 2,825,023 | Marantette | Feb. 25, 1958 |
| 2,832,035 | Bruck et al. | Apr. 22, 1958 |
| 2,876,642 | Scorgie | Mar. 10, 1959 |
| 2,942,174 | Harrison | June 21, 1960 |

FOREIGN PATENTS

| | | |
|---|---|---|
| 146,701 | Australia | June 5, 1952 |

OTHER REFERENCES

"The Emitter-Coupled Differential Amplifier," D. W. Slaughter, IRE Transactions, March 1956, pages 51–53.

"Designing Transistor Circuits," D.C. Regulators, R. B. Hurley, Electronic Equipment, April 1957, pages 20–23.

"Power Regulation by Semiconductors," Chase, Electrical Engineering, September 1956, pages 818–822.